US012525092B2

(12) United States Patent
Agarwal et al.

(10) Patent No.: US 12,525,092 B2
(45) **Date of Patent: *Jan. 13, 2026**

(54) INTEGRATING ONLINE CONTENT STREAMING SERVICES WITH REAL TIME BETTING PLATFORMS

(71) Applicant: SwissClear Global Inc., New York, NY (US)

(72) Inventors: Sundip Agarwal, New York, NY (US); Ashmit Bhattacharya, New York, NY (US)

(73) Assignee: SwissClear Global, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/090,230

(22) Filed: Mar. 25, 2025

(65) Prior Publication Data

US 2025/0232641 A1 Jul. 17, 2025

Related U.S. Application Data

(63) Continuation of application No. 18/385,874, filed on Oct. 31, 2023, now Pat. No. 12,260,704, which is a continuation of application No. 17/510,250, filed on Oct. 25, 2021, now Pat. No. 11,804,101.

(60) Provisional application No. 63/224,353, filed on Jul. 21, 2021.

(51) Int. Cl.

| | |
|---|---|
| ***G07F 17/32*** | (2006.01) |
| ***G06F 21/30*** | (2013.01) |
| ***G06Q 30/0201*** | (2023.01) |

(52) U.S. Cl.
CPC .......... *G07F 17/3241* (2013.01); *G06F 21/30* (2013.01); *G07F 17/3288* (2013.01); *G06Q 30/0201* (2013.01)

(58) Field of Classification Search
CPC .. G07F 17/3241; G07F 17/3288; G06F 21/30; G06Q 30/0201
See application file for complete search history.

*Primary Examiner* — Kevin Y Kim
(74) *Attorney, Agent, or Firm* — Shield Intellectual Property PC; Kirk D. Wong

(57) ABSTRACT

A trusted entity provides an API interface to online streaming platforms and sports betting platforms acting as an intermediary between the online streaming platforms and the sports betting platforms. The trusted entity generates unique authorization tokens that are used to authenticate users between the online streaming platforms and the sports betting platforms and provides a secure environment that separates the online streaming platforms and the sports betting platforms, allowing online streaming platforms to provide online betting services to their users without having to interface to multiple online betting services.

12 Claims, 12 Drawing Sheets

102a 103a 105 101 104 Integration Platform 102b 103b 102c 103c

*provides a canonical standard for online streaming platforms embed online sports betting as a service within their application interface*

Placing a bet across two platforms using Authorization Tokens

601

701

801

901

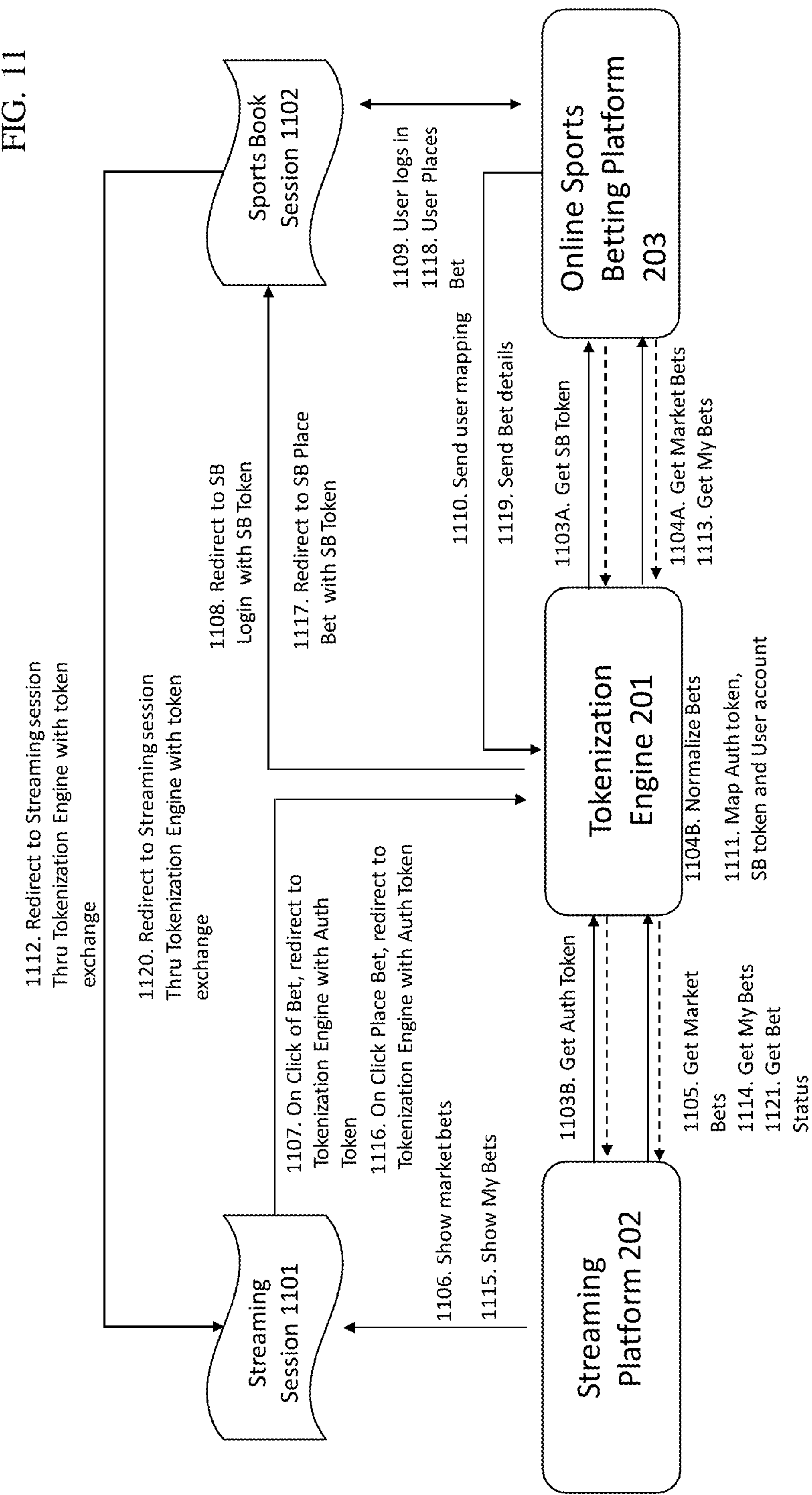
Full Transaction Flow between stakeholders
FIG. 11
Sports Book Session 1102
Online Sports Betting Platform 203
Tokenization Engine 201
Streaming Platform 202
Streaming Session 1101
1109. User logs in
1118. User Places Bet
1108. Redirect to SB Login with SB Token
1117. Redirect to SB Place Bet with SB Token
1110. Send user mapping
1119. Send Bet details
1103A. Get SB Token
1104A. Get Market Bets
1113. Get My Bets
1104B. Normalize Bets
1111. Map Auth token, SB token and User account
1112. Redirect to Streaming session Thru Tokenization Engine with token exchange
1120. Redirect to Streaming session Thru Tokenization Engine with token exchange
1107. On Click of Bet, redirect to Tokenization Engine with Auth Token
1116. On Click Place Bet, redirect to Tokenization Engine with Auth Token
1106. Show market bets
1115. Show My Bets
1103B. Get Auth Token
1105. Get Market Bets
1114. Get My Bets
1121. Get Bet Status SERVER 1230
INTERNET 1228
ISP 1226
LOCAL NETWORK 1222
HOST 1224
NETWORK LINK 1220
1200
STORAGE DEVICE 1210
ROM 1208
MAIN MEMORY 1206
BUS 1202
COMMUNICATION INTERFACE 1218
PROCESSOR 1204
DISPLAY 1212
INPUT DEVICE 1214
CURSOR CONTROL 1216

INTEGRATING ONLINE CONTENT STREAMING SERVICES WITH REAL TIME BETTING PLATFORMS

CROSS-REFERENCE TO RELATED APPLICATIONS

This application claims benefit under 35 U.S.C. § 120 as a Continuation of U.S. application Ser. No. 18/385,874, filed on Oct. 31, 2023, which claims benefit under 35 U.S.C. § 120 as a Continuation of U.S. application Ser. No. 17/510,250, filed Oct. 25, 2021, now U.S. Pat. No. 11,804,101, issued Oct. 31, 2023, which claims benefit under 35 U.S.C. § 119(e) of U.S. Provisional Application No. 63/224,353, filed Jul. 21, 2021. The entire contents of each of these applications are hereby incorporated by reference as if fully set forth herein. Applicant hereby rescinds any disclaimer of claim scope in the parent applications or the prosecution history thereof and advise the USPTO that the claims in this application may be broader than any claim in the parent applications.

TECHNICAL FIELD

Embodiments relate generally to content streaming services and, more specifically, to integrating online content streaming services with sports betting platforms.

BACKGROUND OF THE INVENTION

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Online content streaming is the fastest growing channel for the consumption of sports-based content in the United States. Online sports-based streaming service providers enjoy exclusive content and large customer audiences. These service providers are actively seeking ways to incorporate value added services for audience retention and expansion.

BRIEF DESCRIPTION OF DRAWINGS

The present invention is illustrated by way of example, and not by way of limitation, in the figures of the accompanying drawings and in which like reference numerals refer to similar elements and in which:

FIG. 11 illustrates a data flow diagram between session participants, according to an embodiment of the invention.

DETAILED DESCRIPTION OF THE INVENTION

Figure 1:
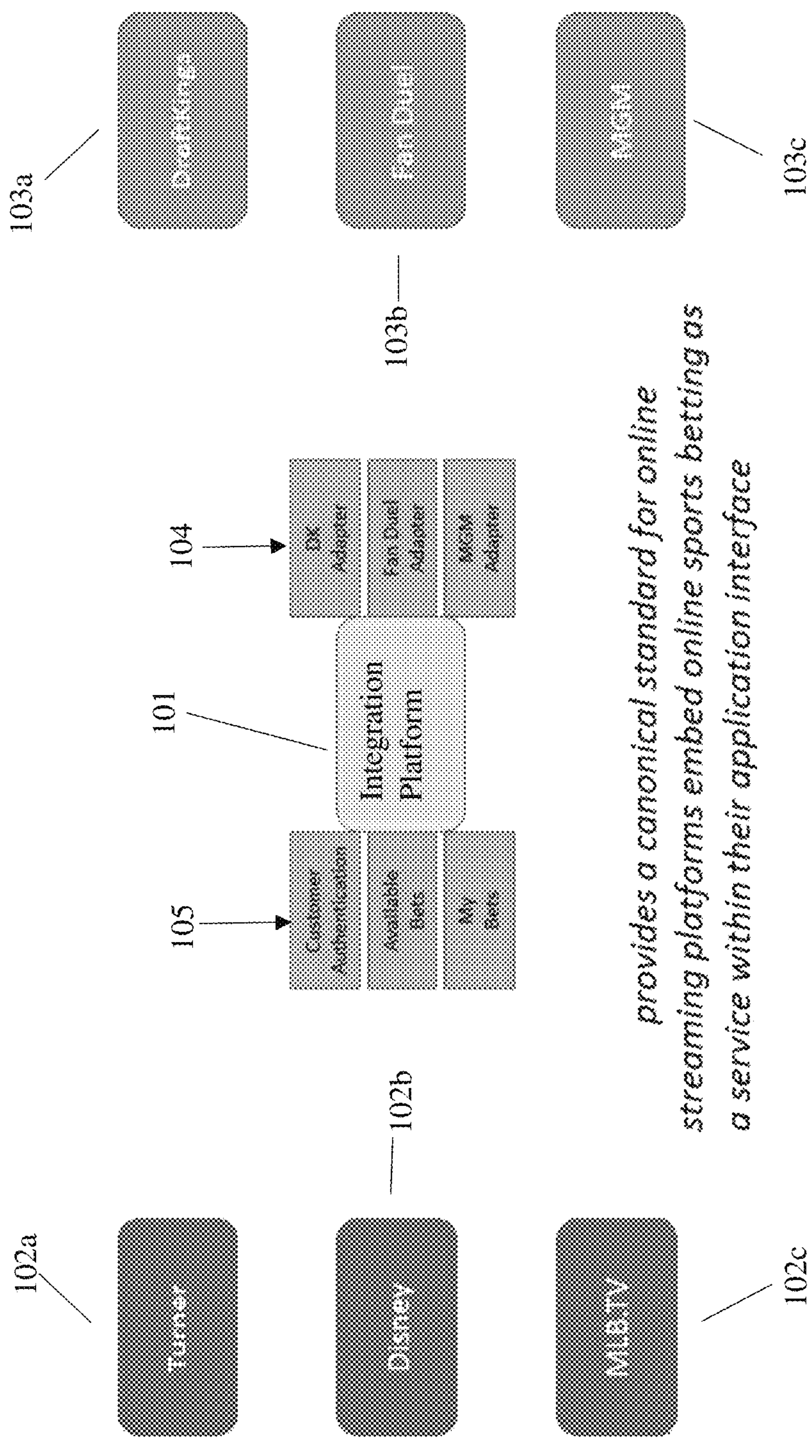
FIG. 1 illustrates an integration platform between online streaming platforms and online betting platforms, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
2.0. Integration Application Programming Interface (API)
  2.1. Enabling users on streaming platforms to login/create accounts at the online sports betting platforms
  2.2. Aggregating, curating and embedding bets within the stream
3.0. Tokenization architecture
4.0. Implementation Mechanism—Hardware Overview
5.0. Equivalents, Extensions, Alternatives and Miscellaneous

1.0 General Overview

The legalization of online sports betting in the United States has galvanized businesses including traditional casinos, operators of online fantasy leagues, and online gambling platform operators from markets like the United Kingdom and Australia.

The opportunity of being able to engage the "long tail" customers who spend significant hours streaming online sports content has been left unaddressed. This audience includes the incidental gamblers, betting small amounts of money through the course of a sporting event, without being nuanced in the intricacies of online sports betting, like customers on an online betting platform. There is sufficient data to show that these customers have higher life-time value (LTV) due to the lower customer acquisition cost (CAC) and higher revenue per customer.

There has been no significant attempts to engage and acquire these customers in a manner that is convenient and easy for the customer and is technically feasible for the online streaming service platforms.

Online sports betting is a nascent industry in the United States with most sportsbook business operators in the early stages of building out platforms and business models. There are little to no standards in the industry especially when it comes to technology integrations and the ability to work across multiple sportsbook platforms. The sportsbook operators are working within their "walled gardens", in some cases to guard their share of market and in most other cases as a concern of how cross platform integrations would be looked on by regulators. With multiple sportsbook operators, each operating their own stove pipe architecture, in the absence of a unifying aggregator, it is impossible for the operators of online content streaming services to engage with all of them.

The online content streaming service industry is a mature industry in the United States with well-established standards on technology platforms and integration models. With significant roll-ups by key operators, a few core platforms have emerged with relatively inflexible technology architectures, as the cost of change is very high. These platforms provide well documented, albeit rigid frameworks for third parties to push content into their streams. Further, content broadcasters are wary of extending their streams to online sportsbooks at the risk of losing their audiences and the associated advertising revenue.

Further, the state of regulations around online sports betting is in tremendous flux. While legal rulings have opened the flood gates to the opportunity, the actual detail of legislating rules around the opportunity has been left to the state Attorney Generals, with each state taking its own unique approach to regulating this business. The sheer variety of regulations, which are ever changing in scope, and nebulous in definition, create significant challenges for the emergence of any standard that can be adopted to build this opportunity at scale.

Platforms and frameworks that can be flexible and easily extended or modified without significant costs will be required to build the "connectors" to bring this opportunity to fruition. An embodiment of the invention provides a solution that is a highly flexible, componentized, cloud native, infinitely scalable, highly secure platform that enables online streaming platforms to easily enable online sports betting as a service to their existing audiences.

An embodiment is a trusted entity that solves three fundamental user requirements which are needed to enable this service:

1) Customers of the online streaming service are able to create an account or login to their existing account at the online sports betting platforms without having to leave their streaming content.
2) These customers are easily able to view the bets that are being offered on the online sports betting platform. These bets are easily understood by the casual betting fan and are significantly simpler and curated for the audience in question.
3) These customers are able to use their balances on the online betting platforms, easily place a bet, and watch how their bet performs via the online streaming service's platform while they are simultaneously watching their online streaming sports content.

Referring to FIG. 1, an embodiment of the invention provides an Application Programming Interface (API) to online streaming services 102*a*-102*c* via a network (e.g., Internet, intranet, extranet, etc.) 106. Each online streaming service 102*a*-102*c* has its own unique user interface where the user views streaming content, such as sports-oriented content. If the user desires to place bets or view betting odds for the sports content that the user is viewing, the user will have some way of indicating in the online streaming service's application that the user wants to have that functionality available. The online streaming service's application calls the API that interfaces with the integration platform 101.

The API provides a consistent, standard interface for online streaming services' streaming application programs to send user requests to online sports betting platforms 103*a*-103*c*. Each of the online sports betting platforms 103*a*-103*c* have their own specific interfaces that are transparent to the online streaming services' streaming application programs because the integration platform 110 communicates with each specific interface using adapters 104 that are customized for each of the online sports betting platforms 103*a*-103*c*. The adapters 104 are used to interface with the online sports betting platforms 103*a*-103*c* via network (e.g., Internet, intranet, extranet, etc.) 106. The API returns display information and functionality 105 that has been curated and formatted by the integration platform 101 to the appropriate streaming application program.

The integration platform 101 translates user requests received from the streaming application programs via the API and directs the user requests to the appropriate online sports betting platform. The integration platform 101 includes modular adapter components 104 that allow the addition of any number of adapters for specific online sports betting platforms, thereby allowing the integration platform 101 to easily expand to include new online sports betting platforms.

2.0 Integration Application Programming Interface (API)

2.1 Enabling Users on Streaming Platforms to Login/Create Accounts at the Online Sports Betting Platforms Current regulations mandate that customers of online sports betting platforms need to register/create accounts or login to their existing accounts only on interfaces and platforms provided by the betting platforms. While API's could be used to enable users on third party platforms like online streaming platforms to log onto the sports betting platforms, existing regulations would immediately bring the streaming platforms within the scope of the regulations.

To address this issue, an embodiment implements the first solution to this problem on browser-based interfaces for sports streaming and sports betting and bypassing the mobile application domain.

Figure 2:
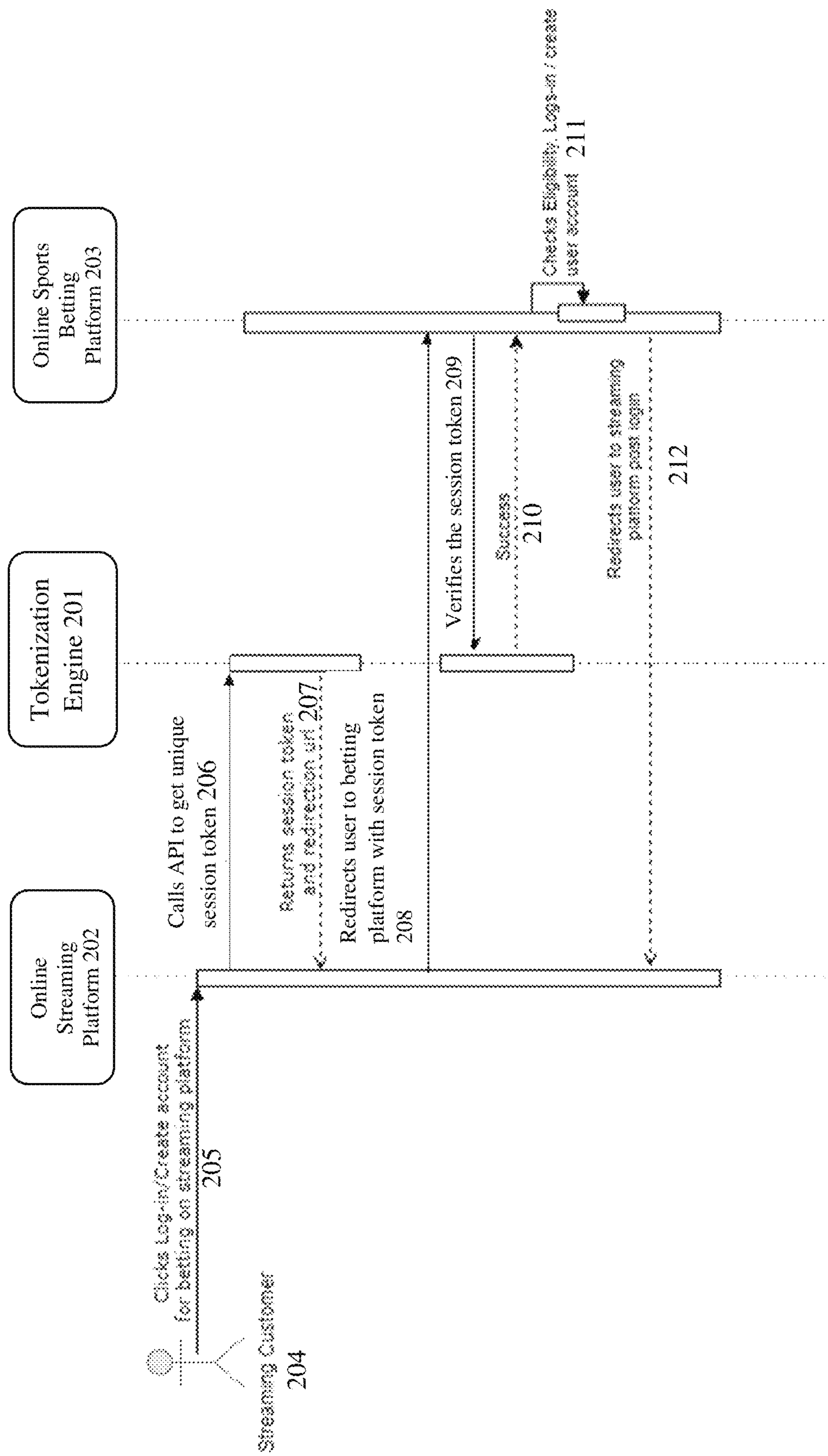
FIG. 2 illustrates a login process sequence between a tokenization engine and an online streaming platform and an online betting platform, according to an embodiment of the invention.
Figure 3:
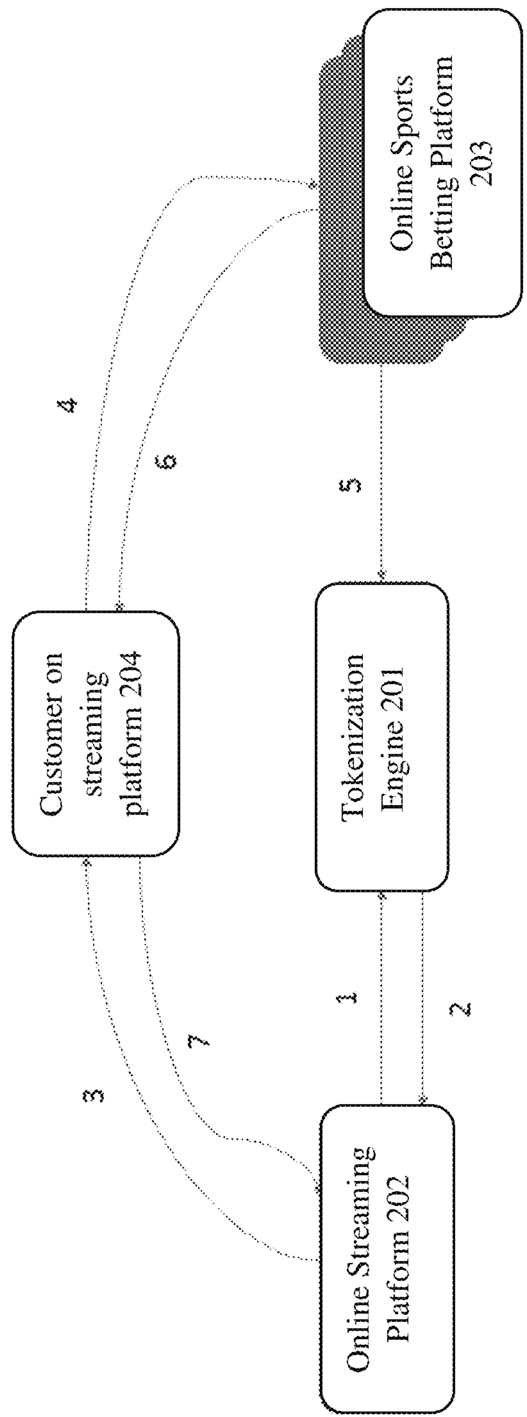
FIG. 3 illustrates a customer authentication data flow between a tokenization engine and an online streaming platform and an online betting platform, according to an embodiment of the invention.
Figure 4:
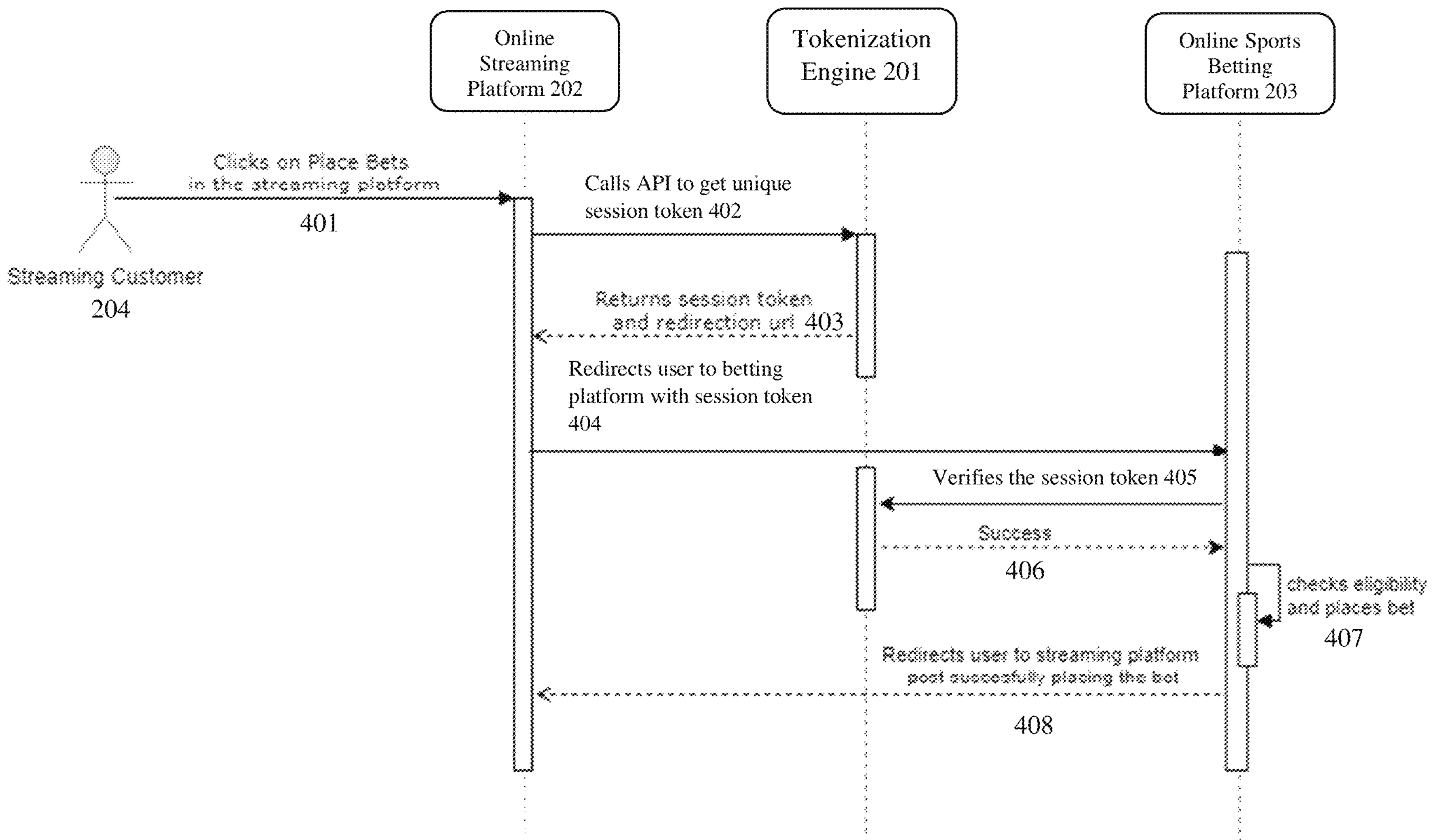
FIG. 4 illustrates a bet process sequence between a tokenization engine and an online streaming platform and an online betting platform, according to an embodiment of the invention.
Figure 5:
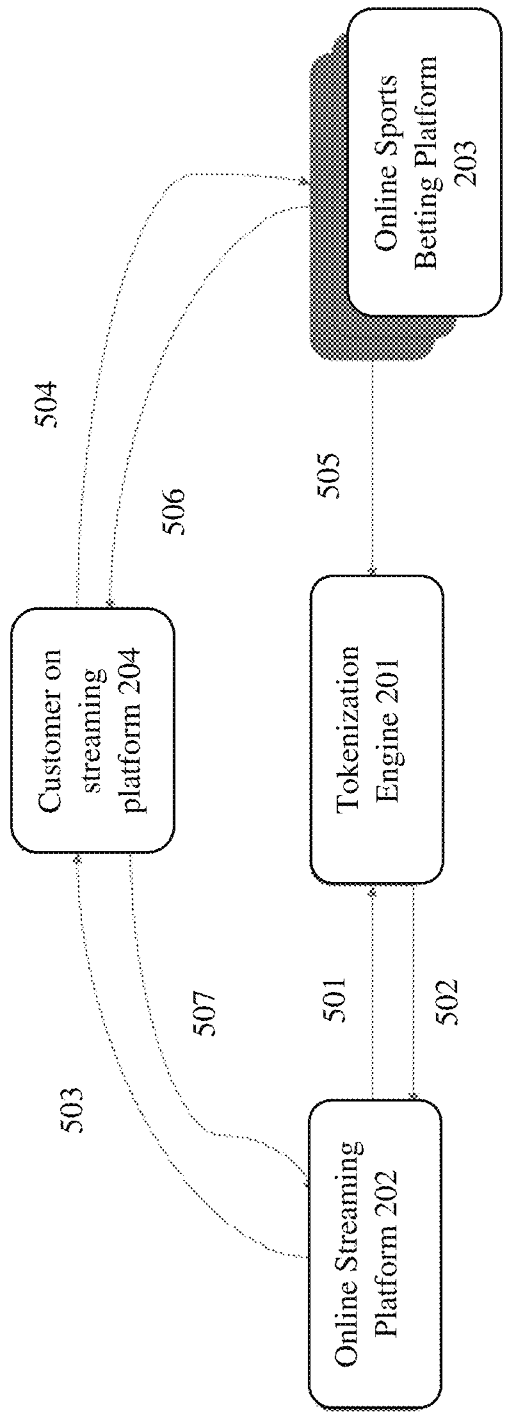
FIG. 5 illustrates a bet data flow between a tokenization engine and an online streaming platform and an online betting platform, according to an embodiment of the invention.
Figure 6:
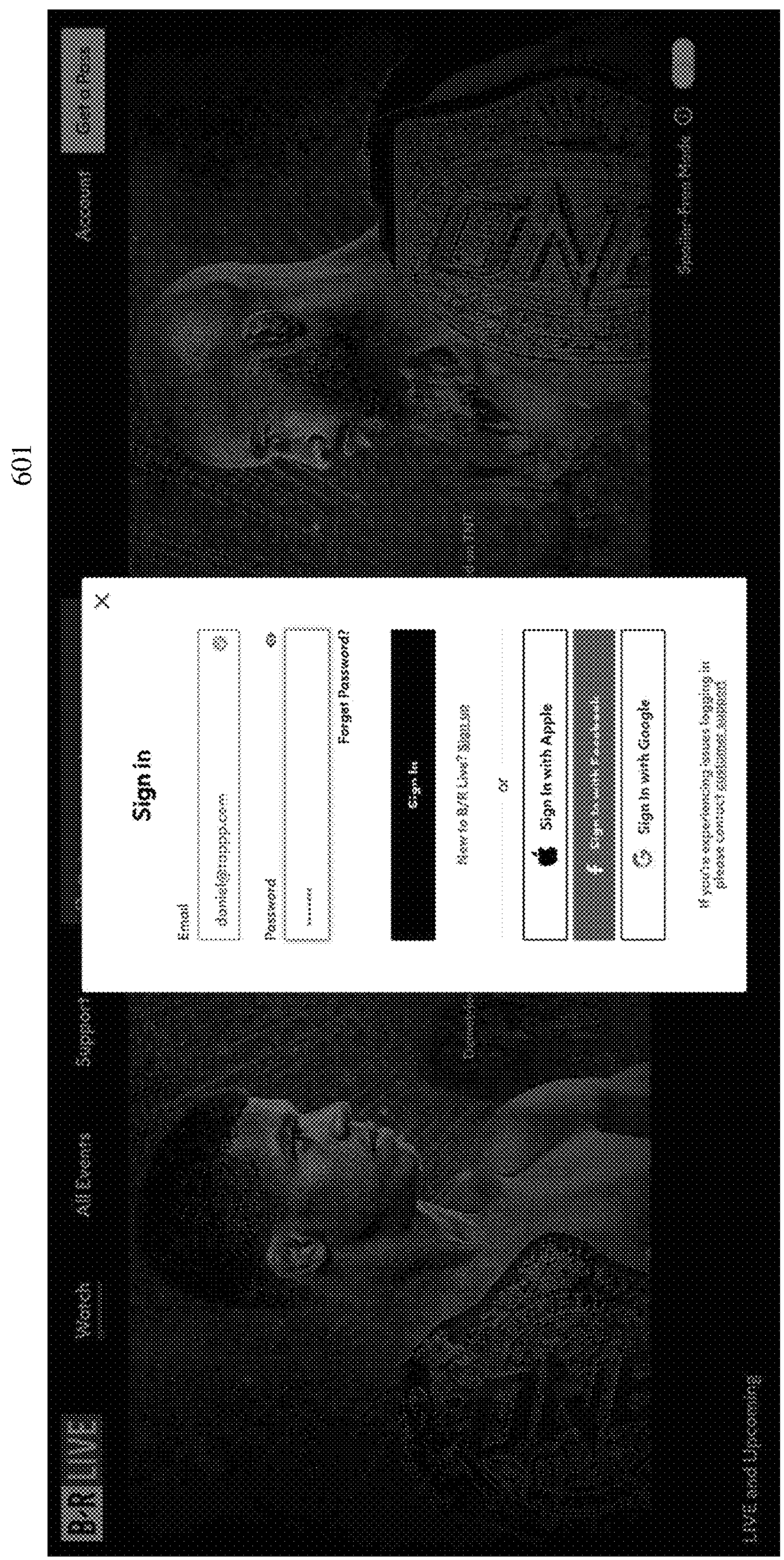
FIG. 6 illustrates a login process screenshot, according to an embodiment of the invention.
Figure 7:
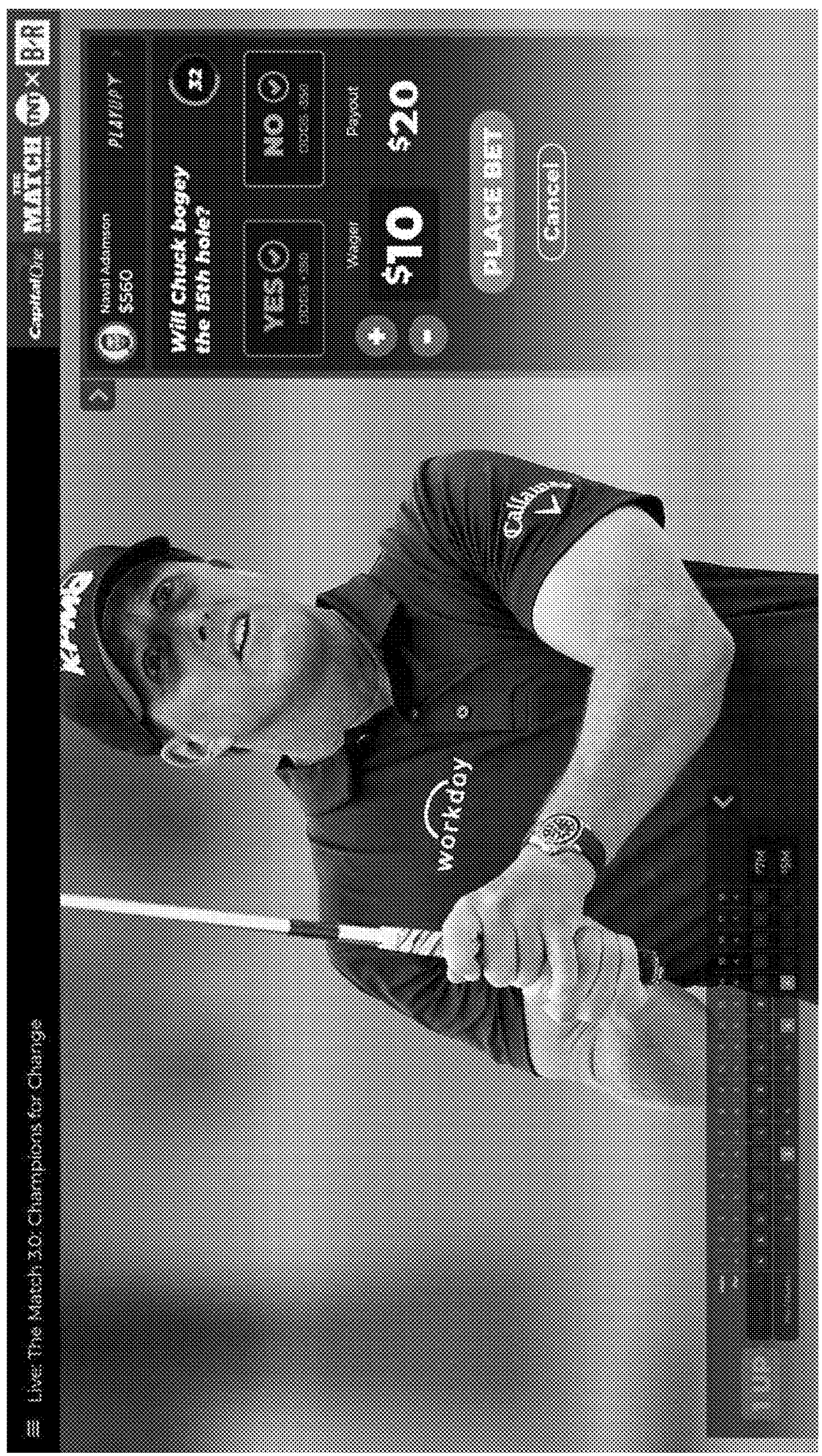
FIG. 7 illustrates an ad banner/iframe screenshot, according to an embodiment of the invention.
Figure 8:
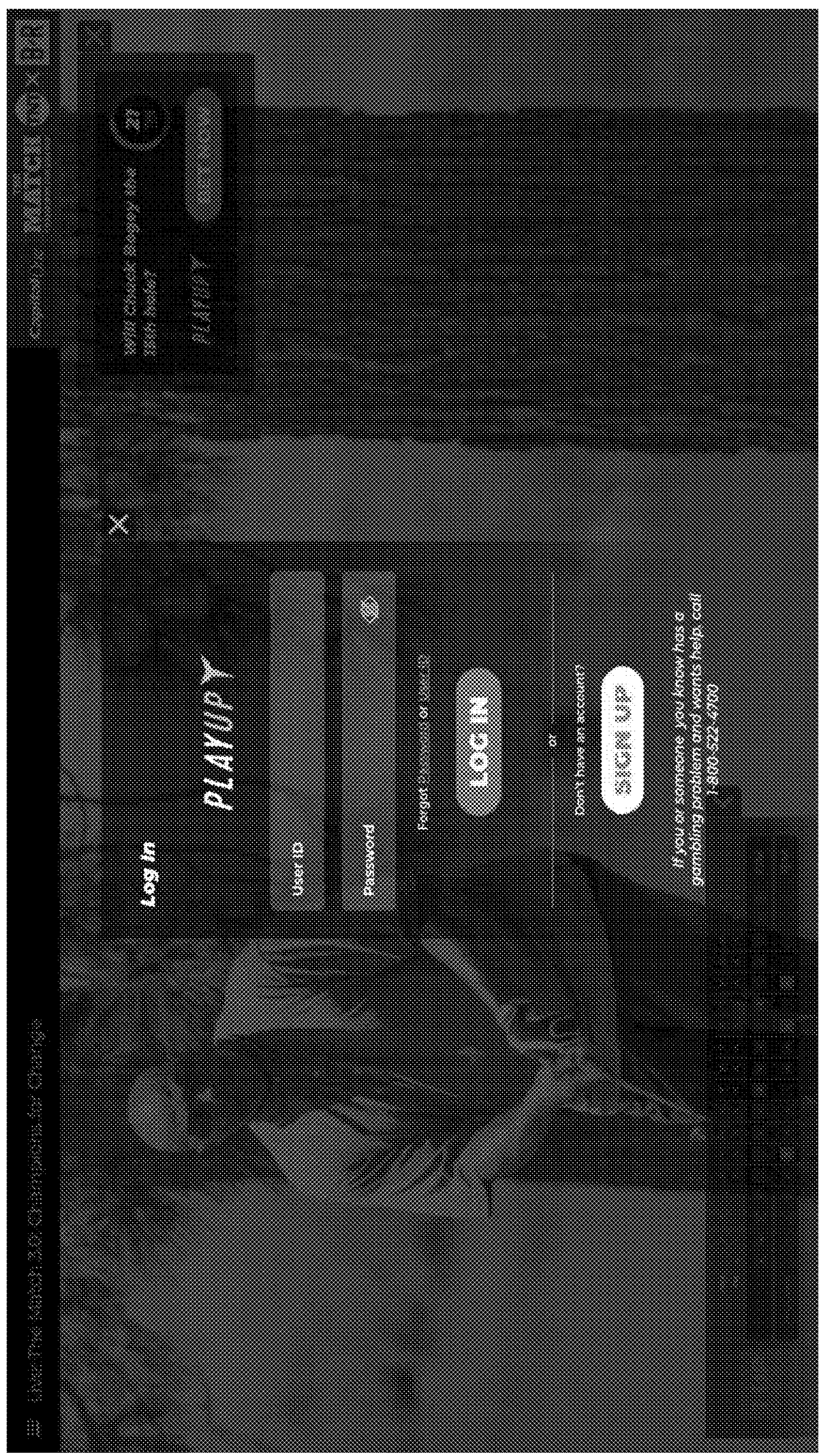
FIG. 8 illustrates an online betting platform login process screenshot, according to an embodiment of the invention.
Figure 9:
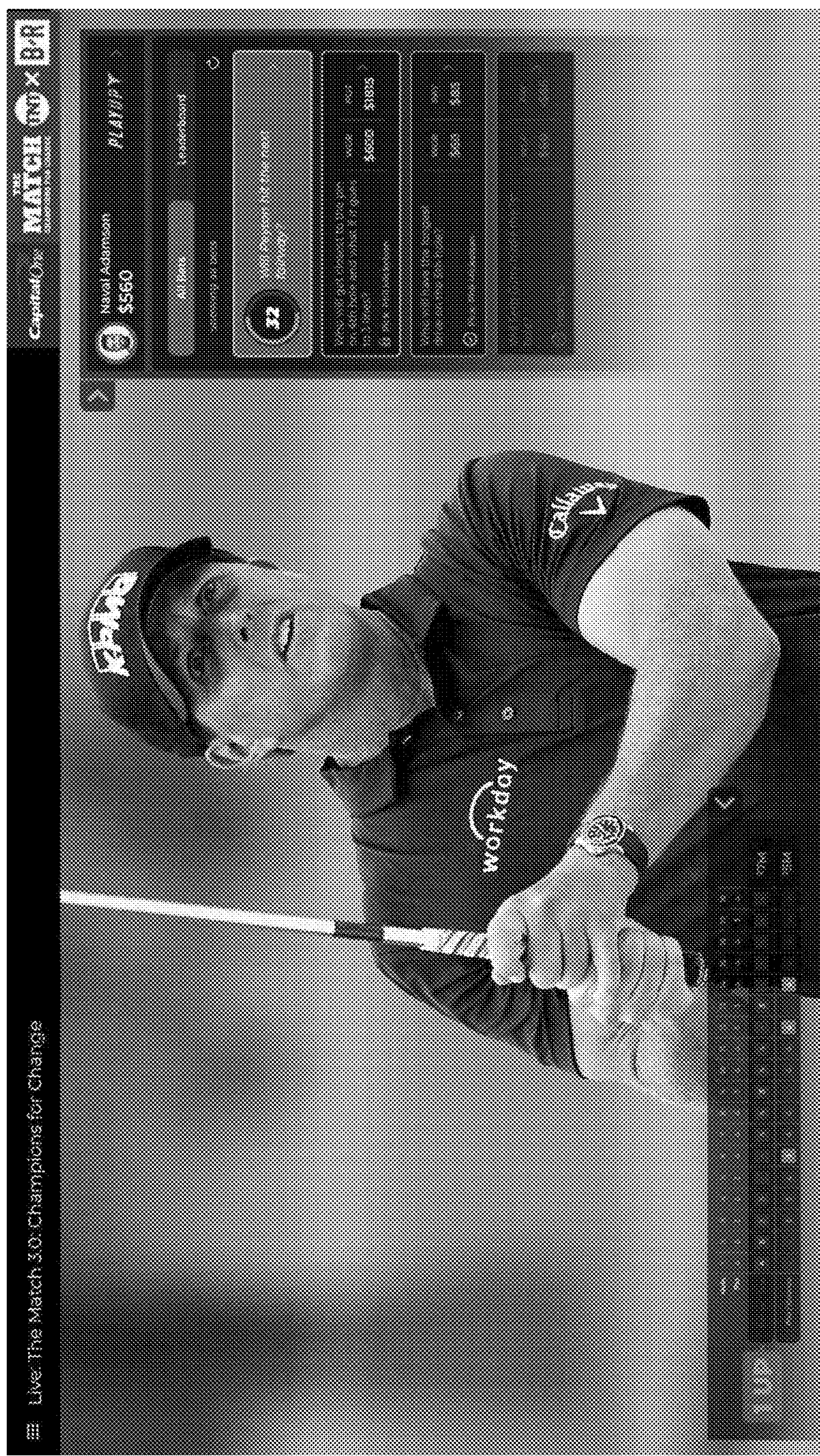
FIG. 9 illustrates an ad banner/iframe screenshot showing possible betting options, according to an embodiment of the invention.

Referring to FIGS. 2, 3, and 6, an embodiment addresses account creation and login on the interface provided by the sports betting platform, while allowing the user to begin and end their journey on the online streaming platform.

1) When the customer 204 clicks Login/Create Account on the icon for the sports betting platform in an ad banner/iframe 205 on the online streaming platform 202 and enters login information into the sign in form 601, the online streaming platform 202 calls an embodiment's API to get a session token unique to that user and unique to the sports betting platform 206.
2) The tokenization engine 201 responds with a token and redirection details to the streaming platform 207.
3) The customer 204 is redirected from the streaming platform to the betting platform along with the token that would be part of session data 208.
4) The customer 204 will login to or create an account on the betting platform 203.
5) On successful account authentication and authorization, the betting platform 203 posts the token 209 to the tokenization engine 201 using a dedicated server side API. The tokenization engine 201 ensures that the token sent and the token received were the same token 210, thereby ensuring that the user associated with this token has successfully been authorized by the betting platform.

6) The customer 204 is redirected back to the streaming platform 212.

7) The customer 204 now starts to see their bets and available bets on the streaming platform 202 in a customized window, thereby associating their account on the streaming platform 202 with their account on the betting platform 203.

The session tokens establish authenticated and authorized trust between two unrelated platforms integrated through the tokenization engine 201.

2.2 Aggregating, Curating and Embedding Bets Within the Stream

There are two cases when interfacing with online betting platforms. The first case is when the online betting platform provides an open API. The open API allows an embodiment to pull available bets on the online betting platform which the embodiment consumes and formats into display data that makes it look much simpler than what the bets look like on the online betting platform. An embodiment can build Machine Language based parsers which can accomplish the same simplification at scale using very modest language training algorithms.

The second case is where the online betting platform does not have an open API. An embodiment has bots which crawl the online betting platform to expose the bets as a simple JSON API adapter for internal and possibly external consumption.

2.3 Enabling Users on a Streaming Platform to Place a Bet on an Online Betting Platform Similar to account creation, existing regulations are very firm in their requirement that when a customer places a bet, it has to be placed on an interface managed, supported and hosted by the online betting platform. There are strict guidelines, which change by state or jurisdiction, over the requirements for such an interface. While API's could again be used to initiate a bet on the online betting platform while the user is still on the online streaming platform, doing so would expose the online streaming platform to compliance with regulations enforced on sports betting platforms.

Referring to FIGS. 4, 5, 7, 8, and 9, an embodiment implements a browser-based solution.

501) When the customer 204 clicks Place Bet on the ad banner or iframe 701 within the streaming platform 401, the online streaming platform 202 calls an embodiment's server side API to get the session token and redirection details 402.

502) The tokenization engine 201 ensures that the bet is still active and ensures that there has been no man-in-the-middle or man-in-the-browser attack vectors on the request and generates a unique session token and redirection details for the platform 403.

503) The customer 204 is redirected to the betting platform to login and place their bet 404.

504) The customer 204 logs in 801 and if they are eligible to place the bet, they do so 407.

505) On successfully placing the bet, the betting platform 203 notifies the tokenization engine 201 that the token was used to place a bet 405. This allows tokenization engine 201 to close the loop on the token and mark the user session as one that has successfully placed a bet 406.

506) The customer 204 is redirected to the streaming platform 408.

507) The customer 204 continues to watch their sports event on the online streaming platform 202 and can now see their own bet status, along with information of new and existing bets 901.

3.0 Tokenization Architecture

Figure 10:
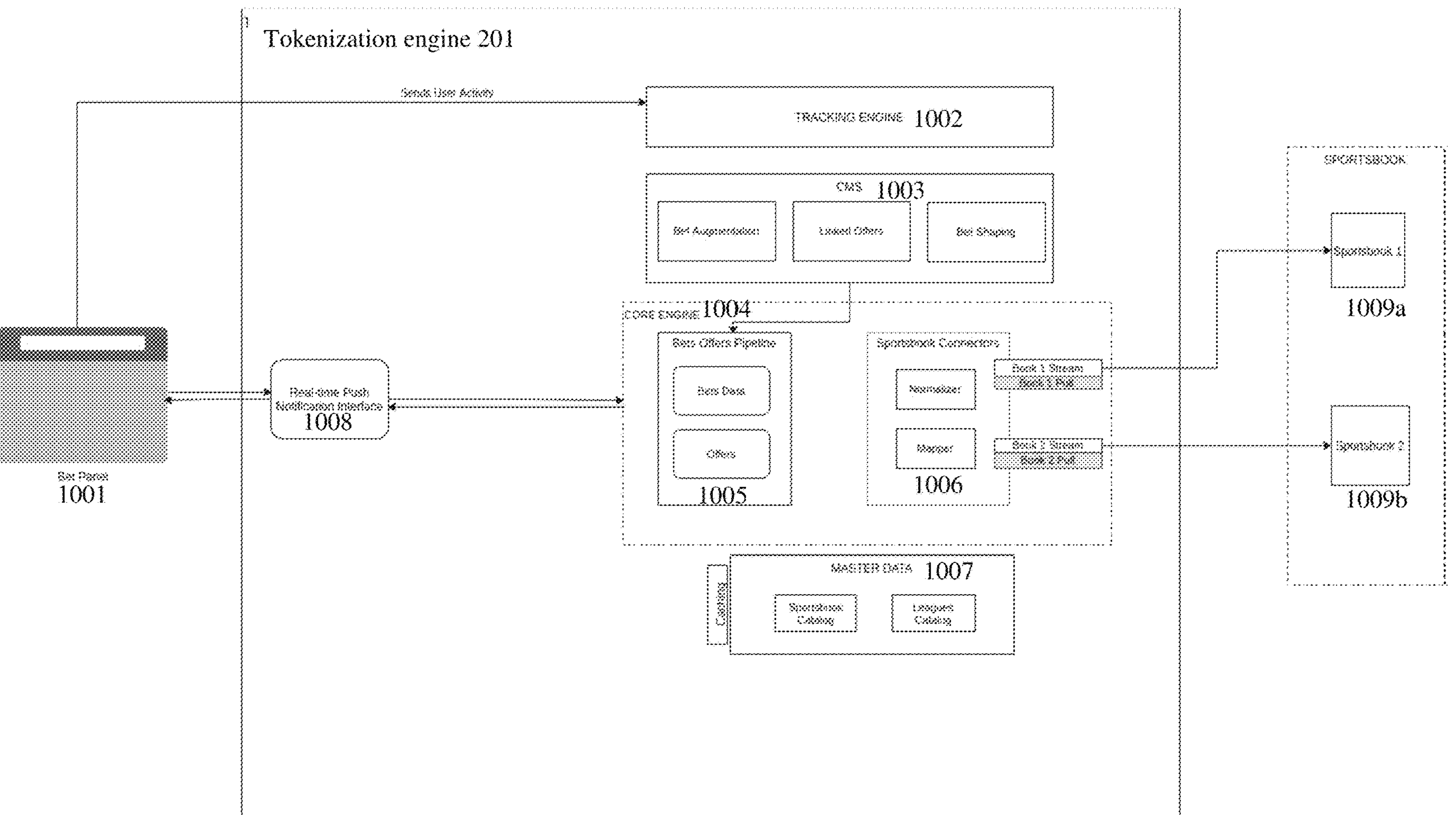
FIG. 10 illustrates a high-level system block diagram, according to an embodiment of the invention.

Referring to FIG. 10, embodiments of the invention are a trusted provider of prepaid payment instruments that can be sold through third party offline and online channels and redeemed for access to content on leading sports streaming service providers. This solution leverages the tokenization engine 201 and can be implemented at scale across nationwide deployments with no breaches of authentication tokens. The tokenization engine 201 may be cloud-based or, for specialized applications, localized.

Streaming platform 202 display application displays a bet panel 1001 to the customer by calling an embodiment's API. The API reports customer activity to tracking engine 1002. Tracking engine 1002 gathers advertisement and media tracking information. All customer initiated user interaction on the betting panel 1001 is tracked using click tracking technology on the betting panel. This information is relayed back to the tracking engine 1002 using reverse HTTP proxy technology. This information not only includes which bets the user demonstrates an interest in but any content which is served up within the betting panel including advertisements, offers, promotions etc., related to third party products and services. The tracking engine 1002 is hence able to analyze which advertisements and media a user watches and measures the length of engagement for each advertisement and media watched. The core engine 1004 is a high transaction, low latency state engine where events like bets, markets and odds are constantly changing at a high frequency. This also includes Linked Offers and promotions introduced through the content management system (CMS) 1003. All this information is then presented to the real-time push notification interface 1008, which maintains a persistent socket with each instance of the betting panel 1001. This architecture ensures that even if millions of instances of the bet panel 1001 are initiated in a short interval of time, like the start of end of a game, this sudden increase in traffic does not impede the operations of the core engine 1004. This makes the design ideal for a sports content streaming environment. In an embodiment, a customer must place bets that are least 20 minutes before the event being betted on in order to compensate for delays in content transmission or DVR read/write delays. This can vary depending on a confidence factor that the streaming content delay is within a threshold of real time. Sportsbook entities typically have a seven second delay before accepting a bet in order to make sure the customer is not gaming the system. Sportsbook entities also typically do not take bets two minutes before the end of an event.

The customer's bet is sent to the online sports betting platform 1009*a* from the sportsbook connectors 1006 via an adapter as discussed above. The online sports betting platform 1009*a* sends bet updates to the sportsbook connectors 1006 via the adapter. The sportsbook connectors 1006 perform bet normalization. Each sportsbook connector adapter API is custom to the particular sportsbook entity because each entity has its own user interface look and feel as well as data formatting. The mapper maps the specific sportsbook information to the system internal message format. The normalizer normalizes information across multiple sportsbooks, so the bets (e.g., odds, bet amounts, payback, etc.) look the same to the user on the bet panel 1001.

The real time push notification interface 1008 receives push messages from the core engine 1004. A bet odds stream for the sports related content that the customer is viewing is pushed from the core engine 1004 thru the real time push notification interface 1008 to the bet panel 1001. The odds change as time goes by and events occur. The bet panel 1001 displays bets from the sports-related content being viewed and bets for teams that the system knows that the user likes, these include in game bets, future game bets, simultaneous bets, etc. The core engine analyzes master data 1007 for sports-related events that are related to the sports-related content that the customer is viewing. The core engine also queries CMS 1003 for any bet augmentation, limited offers and/or bet shaping that relates to the sports-related content that the customer is viewing or is placing bets on. Bet shaping can be based on machine learning and allows the sportsbook to add color commentary (e.g., context information, historical information, commentary information, related bets, etc.) related to the bet. Because of the large number of bets that are available at any point in time, the system can heuristically determine the characteristics of each particular bet in order to perform bet shaping. For example, the system can evaluate a particular bet and the user's betting history and determine that the user typically makes a certain bet after making the particular bet. Another example is that the system can determine that when a particular bet is displayed, other users select a series of bets to also be displayed. In an embodiment, when the system does not have enough information about a user's betting habits, the system determines that the user is similar to a certain group of users (e.g., cohorts, look-alikes, etc.). The content provider may pass tokens to the system that contain information that the content provider knows about the user. This information allows the system to find any other users or groups of users that are similar to the user. The core engine 1004 evaluates the amount and type of bets destined for the bet panel 1001 to reduce any chance that the type or quantity of bets shown in bet panel 1001 interfere with the customer's viewing experience.

Master data 1007 stores catalogs schedules of games and mapping of sportsbook IDs. The master data 1007 creates game schedules using information from the sportsbooks and content providers and places the game schedules into a cache for easy retrieval during runtime. The bets offers pipeline 1005 uses the bets data and offers to create the presentation screen shown in bet panel 1001. As betting odds are changing in real time, the bets offer pipeline 1005 notifies particular bet panels 1001 that the bet panel needs to update itself because certain odds that the bet panel is displaying have changed.

Referring to FIG. 11, a high level transaction flow is shown that illustrates data flow between the streaming platform 202, tokenization engine 201, and the online sports betting platform 203. When the user begins a session on the streaming platform 202 a streaming session is created 1101 on the user's system. The tokenization engine 201 exchanges tokens 1103B with the streaming platform 202 and exchanges tokens 1103A with the sportsbook platform 203. The streaming platform 202 embeds the tokenization token into the user's session 1101. The tokenization engine 201 then requests market bets for the sports content that the user is viewing 1104A from the sportsbook platform 203 and normalizes the bets 1104 before sending the streaming platform 202 the market bets 1105. The streaming platform 202 sends the market bets 1106 to the streaming session 1101.

When the user clicks on a market bet, streaming session 1101 notifies tokenization engine 201 that the user clicked on a bet 1107. The tokenization engine 201 sees that the user has not logged into the sportsbook associated with the bet. The sportsbook session 1102 is created on the user's system by the user's browser. The tokenization engine 201 redirects the user's browser 1108 to the sportsbook session 1102. The user logs into 1109 the sportsbook platform 203. The sportsbook platform sends a cross-reference ID and the tokenization token 1110 to the tokenization engine 201. The tokenization engine 201 creates a map 1111 between the authorization token, user's ID on the steaming platform 202, and the user's ID on the sportsbook platform 203. The sportsbook session 1102 redirects the login confirmation to the streaming session 1101 with the tokenization token from the sportsbook platform 1112.

The tokenization engine 201 handshakes with the sportsbook platform 203 and requests any bets that the user has placed 1113. Those bets are sent 1114 by the tokenization engine 201 to the streaming platform 202. The streaming platform 202 sends the bets 1115 to the streaming session 1101.

When the user places a bet 1116, the streaming session redirects the bet to the tokenization engine 201 with the authorization token from the sportsbook platform 203. The tokenization engine 201 redirects the streaming session 1101 to the sportsbook session 1102 along with the sportsbook token from the tokenization engine 1117. The user bet is placed 1118 on the sportsbook platform 203 by the sportsbook session 1102. The sportsbook session 1102 then switches over 1120 to the streaming session 1101. The sportsbook platform 203 recognizes the sportsbook token from the tokenization engine and sends the bet details to the tokenization engine 201. The bet details are sent 1121 by the tokenization engine 201 to the streaming platform 202 which sends the bet details to the streaming session 1101. When the user places additional bets, the placing bet process repeats. The tokenization engine 201 may store an indication that one or more bets were successfully (and, optionally, unsuccessfully) placed using the mapping of the authorization token, user's ID on the steaming platform 202, and the user's ID on the sportsbook platform 203.

In an embodiment, an apparatus comprises a processor and is configured to perform any of the foregoing methods.

In an embodiment, a non-transitory computer readable storage medium, storing software instructions, which when executed by one or more processors cause performance of any of the foregoing methods.

Note that, although separate embodiments are discussed herein, any combination of embodiments and/or partial embodiments discussed herein may be combined to form further embodiments.

4.0 Implementation Mechanism—Hardware Overview

According to one embodiment, the techniques described herein are implemented by one or more special-purpose computing devices. The special-purpose computing devices may be desktop computer systems, portable computer systems, handheld devices, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques. Such special-purpose computing devices may also combine custom hard-wired logic, ASICs, FPGAs, or other circuitry with custom programming to accomplish the techniques.

Though certain foregoing techniques are described with respect to a hardware implementation, which provides a number of advantages in certain embodiments, it will also be recognized that, in other embodiments, the foregoing techniques may still provide certain advantages when performed partially or wholly in software. Accordingly, in such an embodiment, a suitable implementing apparatus comprises a general-purpose hardware processor and is configured to perform any of the foregoing methods by executing program instructions in firmware, memory, other storage, or a combination thereof.

Figure 12:
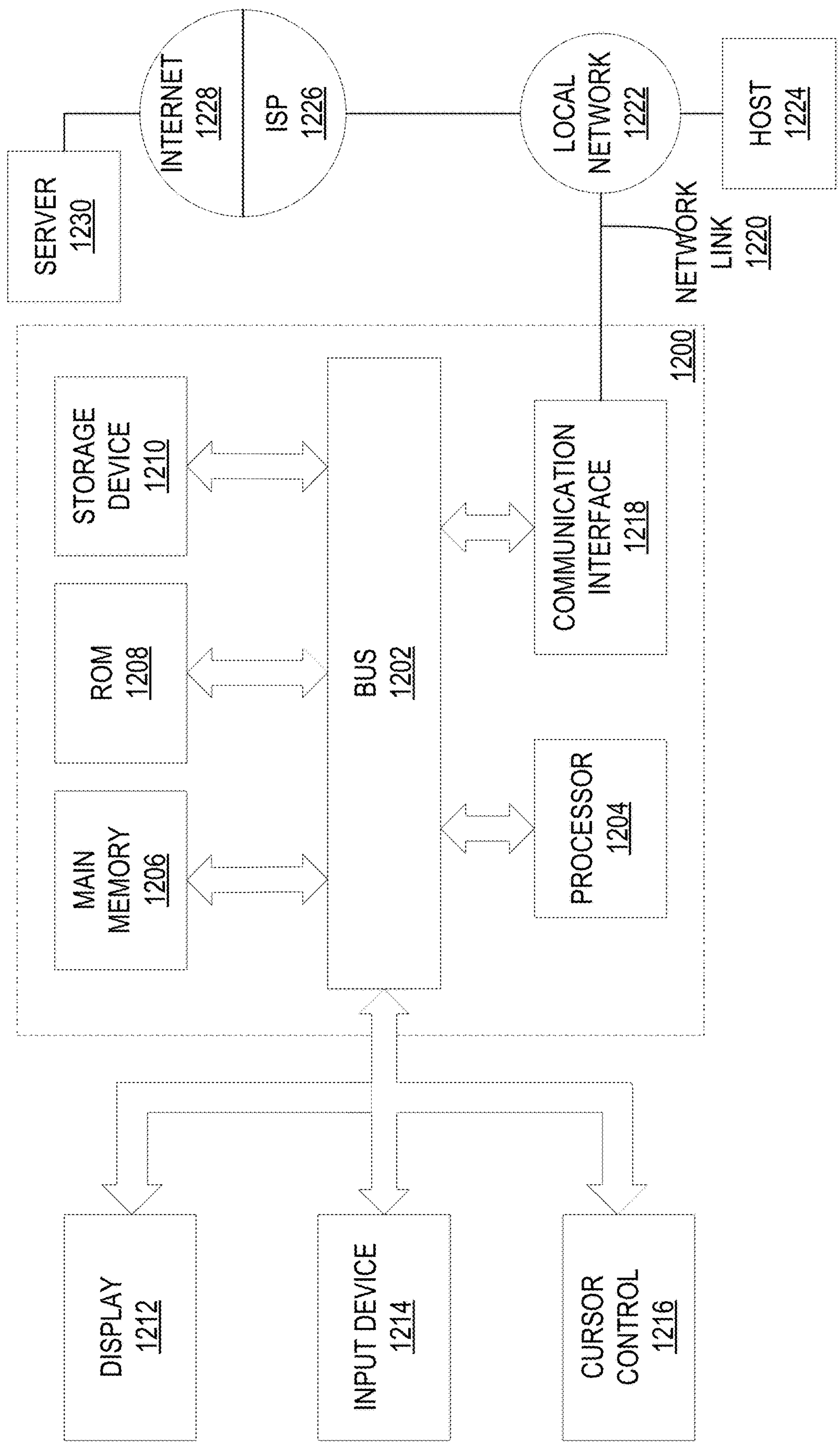
FIG. 12 illustrates a computer system upon which an embodiment may be implemented.

FIG. 12 is a block diagram that illustrates an example computer system 1200 that may be utilized in implementing the above-described techniques, according to an embodiment. Computer system 1200 may be, for example, a desktop computing device, laptop computing device, tablet, smartphone, server appliance, computing mainframe, multimedia device, handheld device, networking apparatus, or any other suitable device. In an embodiment, FIG. 12 constitutes a different view of the devices and systems described in previous sections.

Computer system 1200 may include one or more ASICs, FPGAs, or other specialized circuitry 1203 for implementing program logic as described herein. For example, circuitry 1203 may include fixed and/or configurable hardware logic blocks for implementing some or all of the described techniques, input/output (I/O) blocks, hardware registers or other embedded memory resources such as random-access memory (RAM) for storing various data, and so forth. The logic blocks may include, for example, arrangements of logic gates, flip-flops, multiplexers, and so forth, configured to generate an output signals based on logic operations performed on input signals.

Additionally, and/or instead, computer system 1200 may include one or more hardware processors 1204 configured to execute software-based instructions. Computer system 1200 may also include one or more busses 1202 or other communication mechanism for communicating information. Busses 1202 may include various internal and/or external components, including, without limitation, internal processor or memory busses, a Serial ATA bus, a PCI Express bus, a Universal Serial Bus, a HyperTransport bus, an InfiniBand bus, and/or any other suitable wired or wireless communication channel.

Computer system 1200 also includes one or more memories 1206, such as a RAM, hardware registers, or other dynamic or volatile storage device for storing data units to be processed by the one or more ASICs, FPGAs, or other specialized circuitry 1203. Memory 1206 may also or instead be used for storing information and instructions to be executed by processor 1204. Memory 1206 may be directly connected or embedded within circuitry 1203 or a processor 1204. Or, memory 1206 may be coupled to and accessed via bus 1202. Memory 1206 also may be used for storing temporary variables, data units describing rules or policies, or other intermediate information during execution of program logic or instructions.

Computer system 1200 further includes one or more read only memories (ROM) 1208 or other static storage devices coupled to bus 1202 for storing static information and instructions for processor 1204. One or more storage devices 1210, such as a solid-state drive (SSD), magnetic disk, optical disk, or other suitable non-volatile storage device, may optionally be provided and coupled to bus 1202 for storing information and instructions.

A computer system 1200 may also include, in an embodiment, one or more communication interfaces 1218 coupled to bus 1202. A communication interface 1218 provides a data communication coupling, typically two-way, to a network link 1220 that is connected to a local network 1222. For example, a communication interface 1218 may be an integrated services digital network (ISDN) card, cable modem, satellite modem, or a modem to provide a data communication connection to a corresponding type of telephone line. As another example, the one or more communication interfaces 1218 may include a local area network (LAN) card to provide a data communication connection to a compatible LAN. As yet another example, the one or more communication interfaces 1218 may include a wireless network interface controller, such as an 802.11-based controller, Bluetooth controller, Long Term Evolution (LTE) modem, and/or other types of wireless interfaces. In any such implementation, communication interface 1218 sends and receives electrical, electromagnetic, or optical signals that carry digital data streams representing various types of information.

Network link 1220 typically provides data communication through one or more networks to other data devices. For example, network link 1220 may provide a connection through local network 1222 to a host computer 1224 or to data equipment operated by a Service Provider 1226. Service Provider 1226, which may for example be an Internet Service Provider (ISP), in turn provides data communication services through a wide area network, such as the worldwide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are example forms of transmission media.

In an embodiment, computer system 1200 may send and receive data units through the network(s), network link 1220, and communication interface 1218. In some embodiments, this data may be data units that the computer system 1200 has been asked to process and, if necessary, redirect to other computer systems via a suitable network link 1220. In other embodiments, this data may be instructions for implementing various processes related to the described techniques. For instance, in the Internet example, a server 1230 might transmit a requested code for an application program through Internet 1228, ISP 1226, local network 1222 and communication interface 1218. The received code may be executed by processor 1204 as it is received, and/or stored in storage device 1210, or other non-volatile storage for later execution. As another example, information received via a network link 1220 may be interpreted and/or processed by a software component of the computer system 1200, such as a web browser, application, or server, which in turn issues instructions based thereon to a processor 1204, possibly via an operating system and/or other intermediate layers of software components.

Computer system 1200 may optionally be coupled via bus 1202 to one or more displays 1212 for presenting information to a computer user. For instance, computer system 1200 may be connected via a High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 1212 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 1212.

One or more input devices 1214 are optionally coupled to bus 1202 for communicating information and command selections to processor 1204. One example of an input device 1214 is a keyboard, including alphanumeric and other keys. Another type of user input device 1214 is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane. Yet other examples of suitable input devices 1214 include a touch-screen panel affixed to a display 1212, cameras, microphones, accelerometers, motion detectors, and/or other sensors. In an embodiment, a network-based input device 1214 may be utilized. In such an embodiment, user input and/or other information or commands may be relayed via routers and/or switches on a Local Area Network (LAN) or other suitable shared network, or via a peer-to-peer network, from the input device 1214 to a network link 1220 on the computer system 1200.

As discussed, computer system 1200 may implement techniques described herein using customized hard-wired logic, one or more ASICs or FPGAs 1203, firmware and/or program logic, which in combination with the computer system causes or programs computer system 1200 to be a special-purpose machine. According to one embodiment, however, the techniques herein are performed by computer system 1200 in response to processor 1204 executing one or more sequences of one or more instructions contained in main memory 1206. Such instructions may be read into main memory 1206 from another storage medium, such as storage device 1210. Execution of the sequences of instructions contained in main memory 1206 causes processor 1204 to perform the process steps described herein.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1210. Volatile media includes dynamic memory, such as main memory 1206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1202. Transmission media may also take the form of acoustic or light waves, such as those generated during radio-wave and infra-red data communications.

Various forms of media may be involved in carrying one or more sequences of one or more instructions to processor 1204 for execution. For example, the instructions may initially be carried on a magnetic disk or solid-state drive of a remote computer. The remote computer can load the instructions into its dynamic memory and use a modem to send the instructions over a network, such as a cable network or cellular network, as modulated signals. A modem local to computer system 1200 may receive the data on the network and demodulate the signal to decode the transmitted instructions. Appropriate circuitry may then place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

5.0 Equivalents, Extensions, Alternatives and Miscellaneous

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the inventive subject matter have been described with reference to numerous specific details that may vary from implementation to implementation. Thus, the sole and exclusive indicator of what is the inventive subject matter, and is intended to be the inventive subject matter, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method, comprising:

receiving, by a sports betting platform, a unique authorization token from a user device, the user device having received the unique authorization token and access information for the sports betting platform from a trusted entity;

determining, by the sports betting platform, whether the unique authorization token is valid;

upon a determination that the unique authorization token is valid:

sending, by the sports betting platform, a cross-reference identification and the unique authorization token to the trusted entity;

receiving, by the sports betting platform, a request from the trusted entity for market bets for a content that is being viewed on the user device;

sending, by the sports betting platform, a response that includes market bets for the viewed content to the trusted entity.

2. The method as recited in claim 1, wherein the sports betting platform communicates with the trusted entity through an application programming interface (API) provided by the trusted entity.

3. The method as recited in claim 1, wherein the sending the response further comprises:

determining, by the sports betting platform, teams that a user associated with the cross-reference identification likes;

including bets for the teams that the user associated with the cross-reference identification likes in the response.

4. The method as recited in claim 1, wherein the sending the response further comprises:

determining, by the sports betting platform, teams that a user associated with the cross-reference identification likes;

including bets for the teams that the user associated with the cross-reference identification likes in the response, the bets include any combination of: in game bets, future game bets, or simultaneous bets.

5. The method as recited in claim 1, further comprising:

receiving, by the sports betting platform, a request from the trusted entity for any bets that a user of the user device has placed, the request includes the cross-reference identification;

sending, by the sports betting platform, any bets that have been placed by the user associated with the cross-reference identification to the trusted entity.

6. The method as recited in claim 1, further comprising:

receiving, by the sports betting platform, a request from the user device to place a bet, the request includes the cross-reference identification;

determining, by the sports betting platform, whether the unique authorization token associated with the cross-reference identification is valid;

upon determining that the unique authorization token is valid:

placing, by the sports betting platform, the requested bet for the user;

sending, by the sports betting platform, a confirmation that the requested bet has been placed to the trusted entity, the confirmation includes details of the requested bet.

7. One or more non-transitory computer-readable media, storing one or more sequences of instructions, wherein execution of the one or more sequences of instructions by one or more processors causes the one or more processors to perform:

receiving, by a sports betting platform, a unique authorization token from a user device, the user device having received the unique authorization token and access information for the sports betting platform from a trusted entity;

determining, by the sports betting platform, whether the unique authorization token is valid;

upon a determination that the unique authorization token is valid:

sending, by the sports betting platform, a cross-reference identification and the unique authorization token to the trusted entity;

receiving, by the sports betting platform, a request from the trusted entity for market bets for a content that is being viewed on the user device;

sending, by the sports betting platform, a response that includes market bets for the viewed content to the trusted entity.

8. The one or more non-transitory computer-readable media as recited in claim 7, wherein the sports betting platform communicates with the trusted entity through an application programming interface (API) provided by the trusted entity.

9. The one or more non-transitory computer-readable media as recited in claim 7, wherein the sending the response further comprises:

determining, by the sports betting platform, teams that a user associated with the cross-reference identification likes;

including bets for the teams that the user associated with the cross-reference identification likes in the response.

10. The one or more non-transitory computer-readable media as recited in claim 7, wherein the sending the response further comprises:

determining, by the sports betting platform, teams that a user associated with the cross-reference identification likes;

including bets for the teams that the user associated with the cross-reference identification likes in the response, the bets include any combination of: in game bets, future game bets, or simultaneous bets.

11. The one or more non-transitory computer-readable media as recited in claim 7, wherein execution of the one or more sequences of instructions by the one or more processors causes the one or more processors to further perform:

receiving, by the sports betting platform, a request from the trusted entity for any bets that a user of the user device has placed, the request includes the cross-reference identification;

sending, by the sports betting platform, any bets that have been placed by the user associated with the cross-reference identification to the trusted entity.

12. The one or more non-transitory computer-readable media as recited in claim 7, wherein execution of the one or more sequences of instructions by the one or more processors causes the one or more processors to further perform:

receiving, by the sports betting platform, a request from the user device to place a bet, the request includes the cross-reference identification;

determining, by the sports betting platform, whether the unique authorization token associated with the cross-reference identification is valid;

upon determining that the unique authorization token is valid:

placing, by the sports betting platform, the requested bet for the user;

sending, by the sports betting platform, a confirmation that the requested bet has been placed to the trusted entity, the confirmation includes details of the requested bet.

* * * * *